(12) United States Patent
Lee et al.

(10) Patent No.: US 12,460,970 B2
(45) Date of Patent: Nov. 4, 2025

(54) NANOPHOTONIC HYPERSPECTRAL IMAGING

(71) Applicant: SEMICONDUCTOR COMPONENTS INDUSTRIES, LLC, Scottsdale, AZ (US)

(72) Inventors: Byounghee Lee, Boise, ID (US); Robert Michael Gravelle, Jr., Boise, ID (US); Swarnal Borthakur, Boise, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 18/591,675

(22) Filed: Feb. 29, 2024

(65) Prior Publication Data

US 2025/0277698 A1   Sep. 4, 2025

(51) Int. Cl.
*G01J 3/02* (2006.01)
*G01J 3/28* (2006.01)

(52) U.S. Cl.
CPC .......... *G01J 3/0205* (2013.01); *G01J 3/2803* (2013.01)

(58) Field of Classification Search
CPC .............................. G01J 3/0205; G01J 3/2803
See application file for complete search history.

(56) References Cited

U.S. PATENT DOCUMENTS

| | | |
|---|---|---|
| 2016/0064448 A1 | 3/2016 | Shin |
| 2016/0353039 A1 | 12/2016 | Rephaeli et al. |
| 2018/0045953 A1 | 2/2018 | Fan et al. |
| 2019/0196068 A1 | 6/2019 | Tsai et al. |
| 2021/0118938 A1 | 4/2021 | Roberts et al. |
| 2024/0015383 A1 | 1/2024 | Mun et al. |
| 2024/0145509 A1* | 5/2024 | Mun ..................... H10F 39/182 |

OTHER PUBLICATIONS

Yun, Seokho, et al., "Highly Efficient Color Separation and Focusing in the Sub-micron CMOS Image Sensor", International Electron Devices Meeting (IEDM), Dec. 2021, 4 pages.

U.S. Appl. No. 18/183,106, filed Mar. 13, 2023 listing Ispasoiu, Radu as first inventor, entitled, "Nanophotonic High Dynamic Range Sensor Pixel", 32 pages.

(Continued)

*Primary Examiner* — Tony Ko
(74) *Attorney, Agent, or Firm* — Dickinson Wright PLLC

(57) ABSTRACT

Image sensor pixels and methods for constructing the same. The image sensor pixel includes a first photodetector, a second photodetector, a first spectral router, and a second spectral router. The first spectral router is positioned above the first photodetector and the second photodetector. The first spectral router is configured to direct incident light in a first subset of a first color wavelength range to the first photodetector and direct incident light in a second subset of the first color wavelength range to the second photodetector. The second spectral router is positioned above the first spectral router. The second spectral router is configured to direct the incident light in the first subset and the second subset of the first color wavelength range to the first spectral router. The second spectral router is configured to direct incident light in a second color wavelength range to one or more neighboring image sensor pixels.

20 Claims, 7 Drawing Sheets

(56) References Cited

OTHER PUBLICATIONS

U.S. Appl. No. 18/309,906, filed May 1, 2023 listing Banachowicz, Bartosz Piotr as first inventor, entitled, "Nanophotonic Global Shutter Sensor", 32 pages.

Qin Chen, et al., "Nanophotonic Image Sensors" Material Views—Nanophotonics, 2016, 12, No. 36, p. 4922-4935 www.small-journal.com.

Search Report and Written Opinion from the German Patent Office mailed Sep. 23, 2024 having German Patent Application No. 10 2024 116 553.7.

Catrysse, .P.B., & Fan, S. "Spectral Routers for Snapshot Multispectral Imaging." Applied Physics Letters 123.26 (2023) [abstract] at https://pubs.aip.org/aip/apl/article-abstract/123/26/261105/2931557/ (Dec. 2023).

* cited by examiner

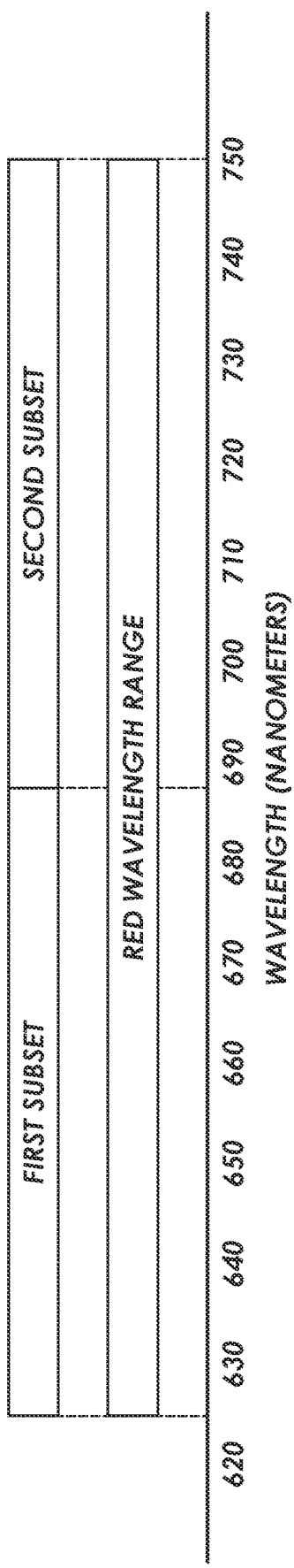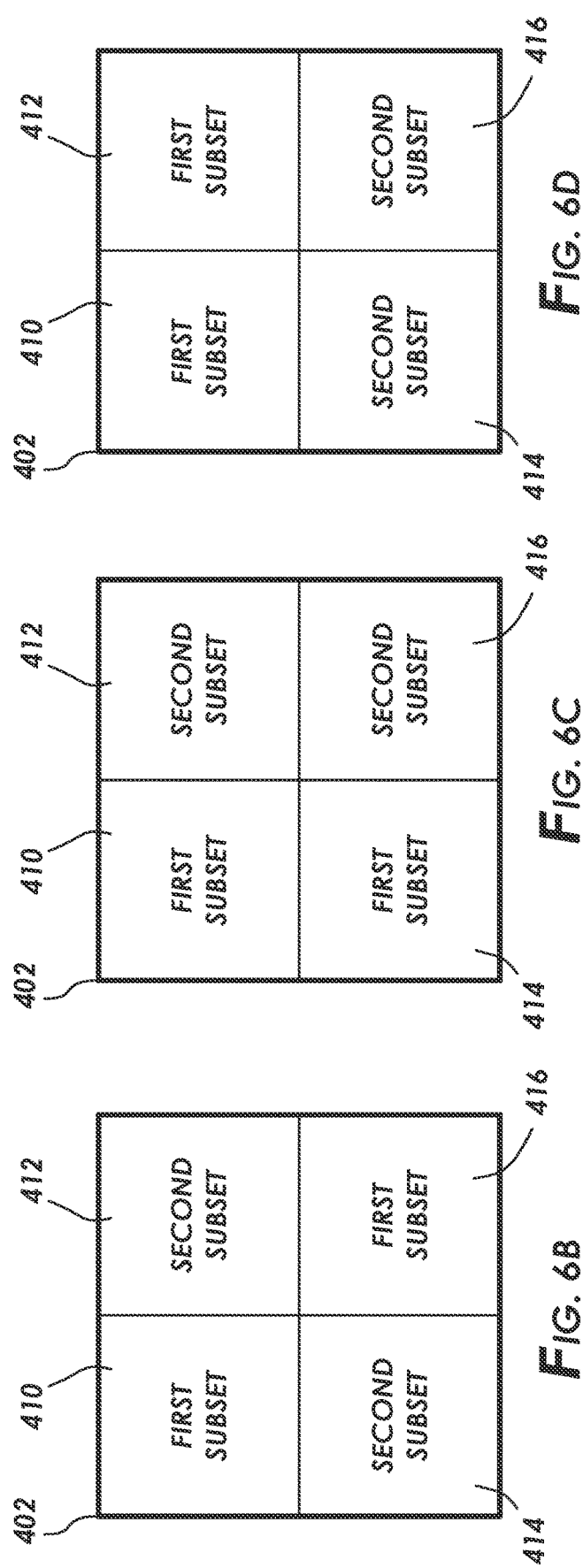
FIG. 6A
FIG. 6B
FIG. 6C
FIG. 6D

NANOPHOTONIC HYPERSPECTRAL IMAGING

BACKGROUND

Image sensors are used in electronic devices such as cellular telephones, cameras, and computers to capture images. In particular, an electronic device is provided with an array of image sensor pixels arranged in a grid pattern. Each image sensor pixel receives incident photons, such as light, and converts the photons into electrical signals. Column circuitry is coupled to each column for reading out sensor signals from each image sensor pixel.

SUMMARY

For each pixel in an image, a hyperspectral camera may acquire the light intensity for a large number of contiguous spectral bands (typically a few tens to several hundred). Every pixel in the image thus contains a continuous spectrum and can be used to characterize the objects in the scene with great precision and detail. The present disclosure provides image sensor pixels, image sensors, and methods that, among other things, provide hyperspectral imaging using nanophotonic light guides (or spectral routers) to split color wavelength bands into sub-bands.

The present disclosure provides an image sensor pixel including, in one implementation, a plurality of photodetectors, a first spectral router, and a second spectral router. The plurality of photodetectors includes at least a first photodetector and a second photodetector. The first spectral router is positioned above at least the first photodetector and the second photodetector. The first spectral router is configured to direct incident light in a first subset of a first color wavelength range to the first photodetector. The first spectral router is also configured to direct incident light in a second subset of the first color wavelength range to the second photodetector. The second spectral router is positioned above the first spectral router. The second spectral router is configured to direct the incident light in the first subset and the second subset of the first color wavelength range to the first spectral router. The second spectral router is configured to direct incident light in a second color wavelength range to one or more neighboring image sensor pixels.

The present disclosure also provides an image sensor pixel including, in one implementation, a pixel array and a controller. The pixel array includes an image sensor pixel. The image sensor pixel includes a first photodetector, a second photodetector, a first spectral router, and a second spectral router. The first spectral router is configured to direct incident light in a first subset of a first color wavelength range to the first photodetector. The first spectral router is also configured to direct incident light in a second subset of the first color wavelength range to the second photodetector. The second spectral router is configured to direct incident light in the first color wavelength range to the first spectral router. The second spectral router is also configured to direct incident light in a second color wavelength range to one or more neighboring image sensor pixels in the pixel array. The controller is configured to determine a first amount of light detected by the first photodetector. The controller is also configured to determine a second amount of light detected by the second photodetector.

The present disclosure further provides a method for constructing an image sensor pixel. The method includes forming a plurality of photodetectors including at least a first photodetector and a second photodetector. The method also includes forming a first spectral router positioned above at least the first photodetector and the second photodetector. The first spectral router is configured to direct incident light in a first subset of a first color wavelength range to the first photodetector. The first spectral router is also configured to direct incident light in a second subset of the first color wavelength range to the second photodetector. The method further includes forming a second spectral router positioned above the first spectral router. The second spectral router is configured to direct the incident light in the first subset and the second subset of the first color wavelength range to the first spectral router. The second spectral router is also configured to direct incident light in a second color wavelength range to one or more neighboring image sensor pixels.

BRIEF DESCRIPTION OF THE DRAWINGS

For a detailed description of example implementations, reference will now be made to the accompanying drawings in which:

FIG. 6A is a graph of an example of the red light wavelength range divided into two wavelength subsets in accordance with some implementations;

FIG. 6B is a view of an example of a diagonally arranged red split-pixel configured to detect two wavelength subsets in accordance with some implementations;

FIG. 6C is a view of an example of a horizontally arranged red split-pixel configured to detect two wavelength subsets in accordance with some implementations;

FIG. 6D is a view of an example of a vertically arranged red split-pixel configured to detect two wavelength subsets in accordance with some implementations.

DEFINITIONS

Figure 1A:
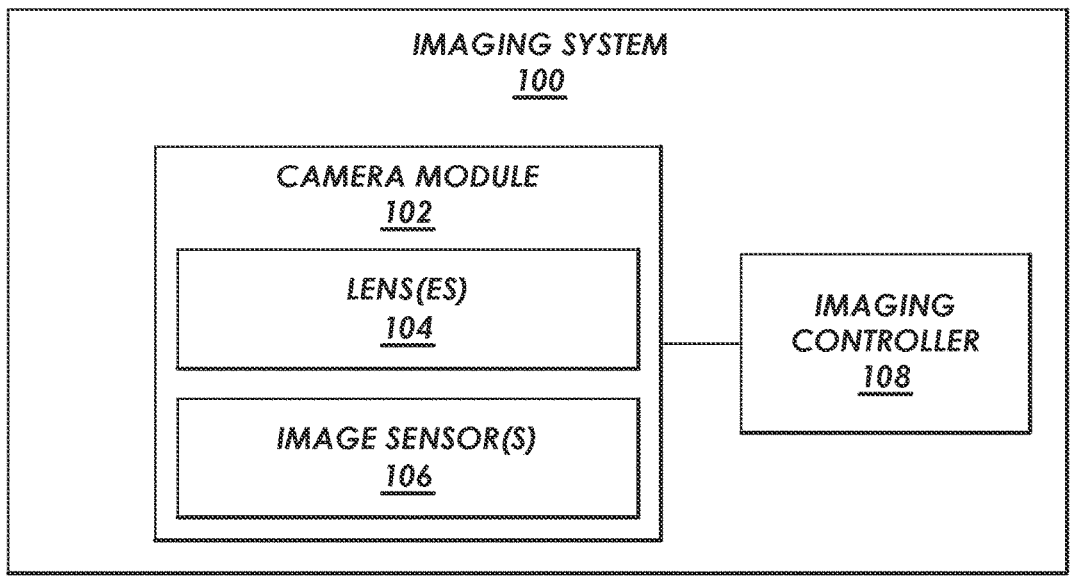
FIG. 1A is a block diagram of an example of an imaging system in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an openended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate the fact the recited referent may be plural.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Light" or "color" shall mean visible light ranging between about 380 and 700 nanometers. "Light" or "color" shall also mean light ranging between 700 nanometers to 800 nanometers, and invisible light, such as infrared light ranging between about 800 nanometer and 1 millimeter. "Light" or "color" shall also mean invisible light, such as ultraviolet light ranging between about 100 nanometers to 400 nanometers.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to image sensor pixels, image sensors, and related methods. More particularly, at least some examples are directed to image sensor pixels and imaging systems that provide hyperspectral imaging. More particular still, various examples are directed to split-pixels that use nanophotonic light guides (or spectral routers) to split color wavelength bands into sub-bands. The specification now turns to an example system to orient the reader.

FIG. 1A shows an example of an imaging system 100. In particular, the imaging system 100 may be a portable electronic device such as a camera, a cellular telephone, a tablet computer, a webcam, a video camera, a video surveillance system, or a video gaming system with imaging capabilities. In other cases, the imaging system 100 may be an automotive imaging system. The imaging system 100 illustrated in FIG. 1A includes a camera module 102 that may be used to convert incoming light into digital image data. The camera module 102 may include one or more lenses 104 and one or more corresponding image sensors 106. The lenses 104 may include fixed and/or adjustable lenses. During image capture operations, light from a scene may be focused onto the image sensor 106 by the lenses 104. The image sensor 106 may comprise circuitry for converting analog pixel data into corresponding digital image data to be provided to the imaging controller 108. If desired, the camera module 102 may be provided with an array of lenses 104 and an array of corresponding image sensors 106.

The imaging controller 108 may include one or more integrated circuits. The imaging circuits may include image processing circuits, microprocessors, and storage devices, such as random-access memory, and non-volatile memory. The imaging controller 108 may be implemented using components that are separate from the camera module 102 and/or that form part of the camera module 102, for example, circuits that form part of the image sensor 106. Digital image data captured by the camera module 102 may be processed and stored using the imaging controller 108. Processed image data may, if desired, be provided to external equipment, such as computer, external display, or other device, using wired and/or wireless communications paths coupled to the imaging controller 108.

Figure 1B:
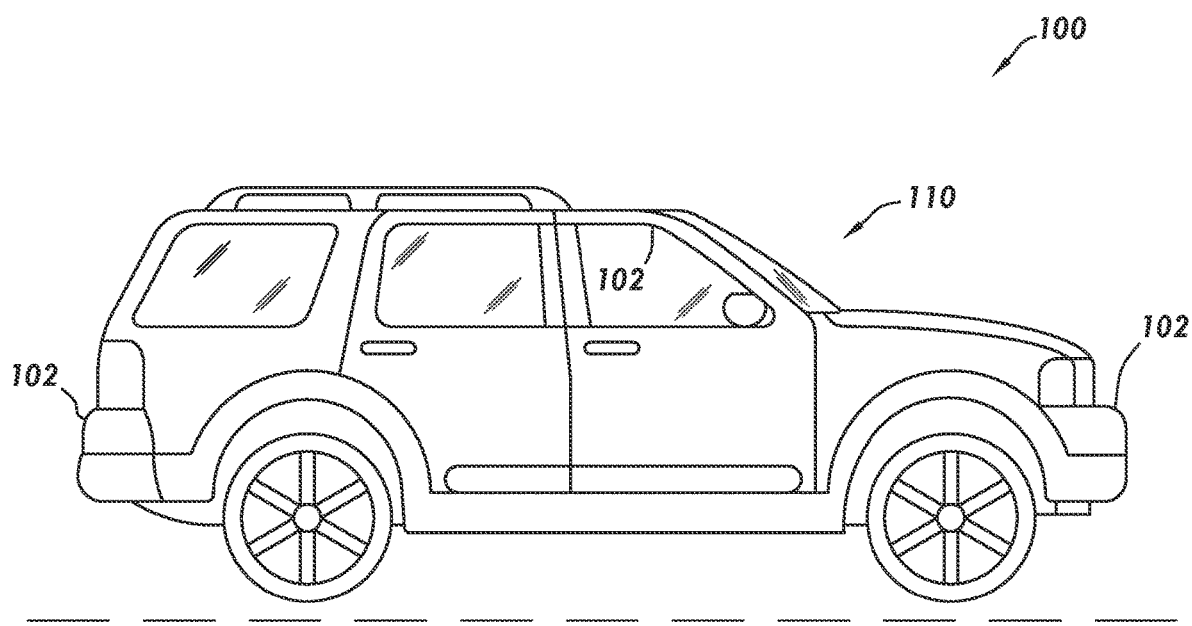
FIG. 1B is a diagram of an example of an imaging system incorporated in a vehicle in accordance with some implementations.

FIG. 1B shows another example of the imaging system 100. The imaging system 100 illustrated in FIG. 1B comprises an automobile or vehicle 110. The vehicle 110 is illustratively shown as a passenger vehicle, but the imaging system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 1B, the vehicle 110 includes a forward-looking camera module 102 arranged to capture images of scenes in front of the vehicle 110. Such forward-looking camera module 102 can be used for any suitable purpose, such as lane-keeping assist, collision warning systems, distance-pacing cruise-control systems, autonomous driving systems, and proximity detection. The vehicle 110 further comprises a backward-looking camera module 102 arranged to capture images of scenes behind the vehicle 110. Such backward-looking camera module 102 can be used for any suitable purpose, such as collision warning systems, reverse direction video, autonomous driving systems, proximity detection, monitoring position of overtaking vehicles, and backing up. The vehicle 110 may further comprise an inside-looking camera module 102 arranged to capture images of scenes inside the vehicle 110. Such inside-looking camera module 102 can be used for any suitable purpose, such as an in-cabin Driver Monitoring System (DMS) and a Driver plus Occupant Monitoring System (DOMS). The vehicle 110 further comprises a side-looking camera module 102 arranged to capture images of scenes beside the vehicle 110. Such side-looking camera module can be used for any suitable purpose, such as blind-spot monitoring, collision warning systems, autonomous driving systems, monitoring position of overtaking vehicles, lane-change detection, and proximity detection. In situation in which the imaging system 100 is a vehicle, the imaging controller 108 may be a controller of the vehicle 110. The discussion now turns in greater detail to the image sensor 106 of the camera module 102.

Figure 2:
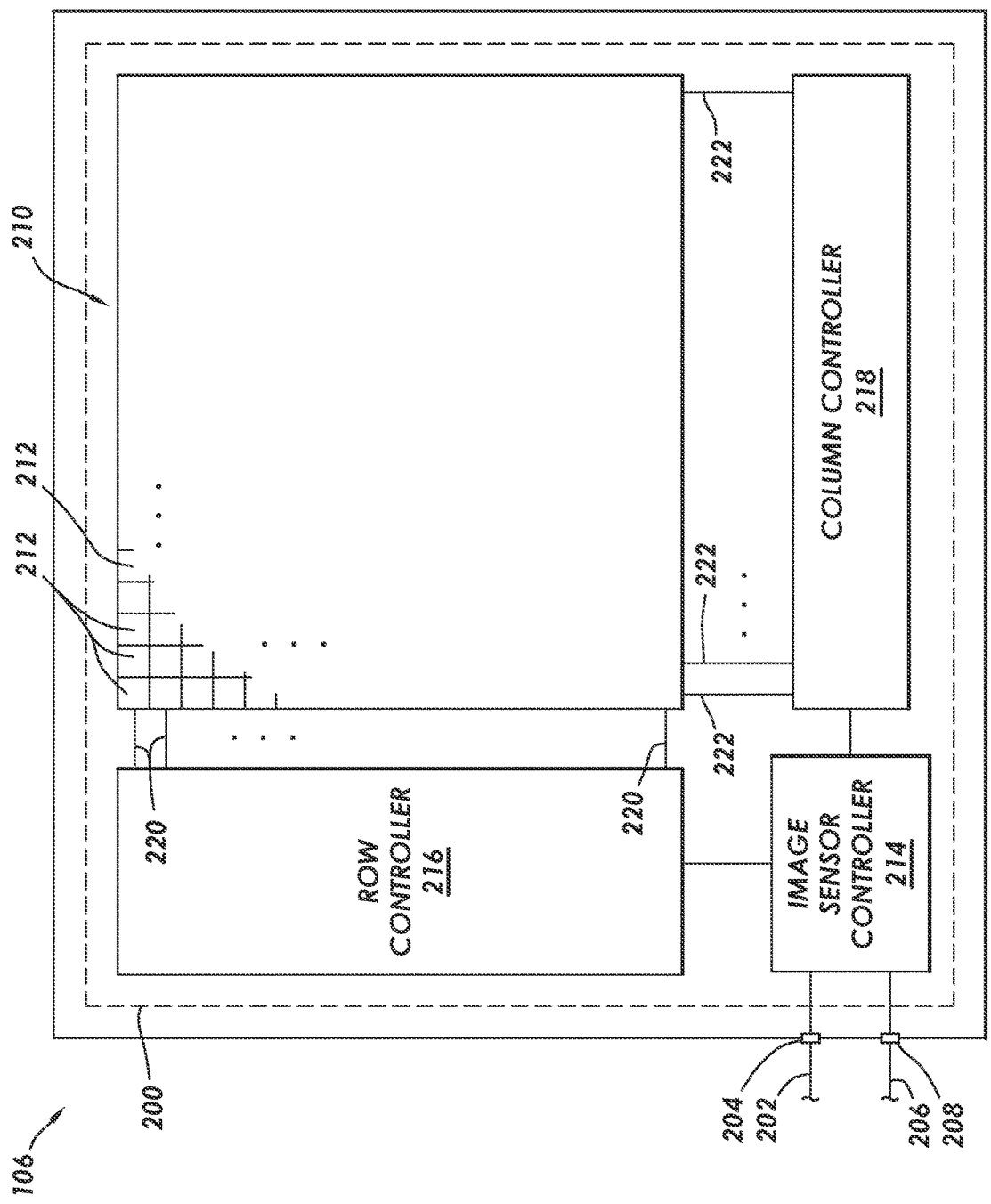
FIG. 2 is a partial schematic and a partial block diagram of an example of an image sensor in accordance with some implementations.

FIG. 2 shows an example of the image sensor 106. In particular, FIG. 2 shows that the image sensor 106 may comprise a substrate 200 of semiconductor material (for example, silicon) encapsulated within packaging to create a packaged semiconductor device or packaged semiconductor product. Bond pads or other connection points of the substrate 200 couple to terminals of the image sensor 106, such as the serial communication channel 202 coupled to terminal(s) 204, and capture input 206 coupled to terminal 208. Additional terminals will be present, such as ground, common, or power, but the additional terminals are omitted so as not to unduly complicate the figure. While a single instance of the substrate 200 is shown, in other cases multiple substrates may be combined to form the image sensor 106 to form a multi-chip module.

The image sensor 106 comprises a pixel array 210 containing a plurality of image sensor pixels 212 arranged in rows and columns. Pixel array 210, being one example of an "array of pixels," may comprise, for example, hundreds or thousands of rows and columns of image sensor pixels 212. Control and readout of the pixel array 210 may be implemented by an image sensor controller 214 coupled to a row controller 216 and a column controller 218. The row controller 216 may receive row addresses from image sensor controller 214 and supply corresponding row control signals to image sensor pixels 212, such as reset, row-select, charge transfer, dual conversion gain, and readout control signals. The row control signals may be communicated over one or more conductors, such as row control paths 220.

Column controller 218 may be coupled to the pixel array 210 by way of one or more conductors, such as column lines 222. Column controllers may sometimes be referred to as column control circuits, readout circuit, or column decoders. Column lines 222 may be used for reading out image signals from image sensor pixels 212 and for supplying bias currents and/or bias voltages to image sensor pixels 212. If desired, during pixel readout operations, a pixel row in the pixel array 210 may be selected using row controller 216 and image signals generated by image sensor pixels 212 in that pixel row can be read out along column lines 222.

The column controller 218 may include sample-and-hold circuitry for sampling and temporarily storing image signals read out from pixel array 210, amplifier circuitry, analog-to-digital conversion (ADC) circuitry, bias circuitry, column memory, latch circuitry for selectively enabling or disabling the column circuitry, or other circuitry that is coupled to one or more columns of pixels in the pixel array 210 for operating the image sensor pixels 212 and for reading out image signals from the image sensor pixels 212. ADC circuitry in the column controller 218 may convert analog pixel values received from the pixel array 210 into corresponding digital image data. Column controller 218 may supply digital image data to the image sensor controller 214 and/or the imaging controller 108 (FIG. 1A) over, for example, the serial communication channel 202.

Figure 3:
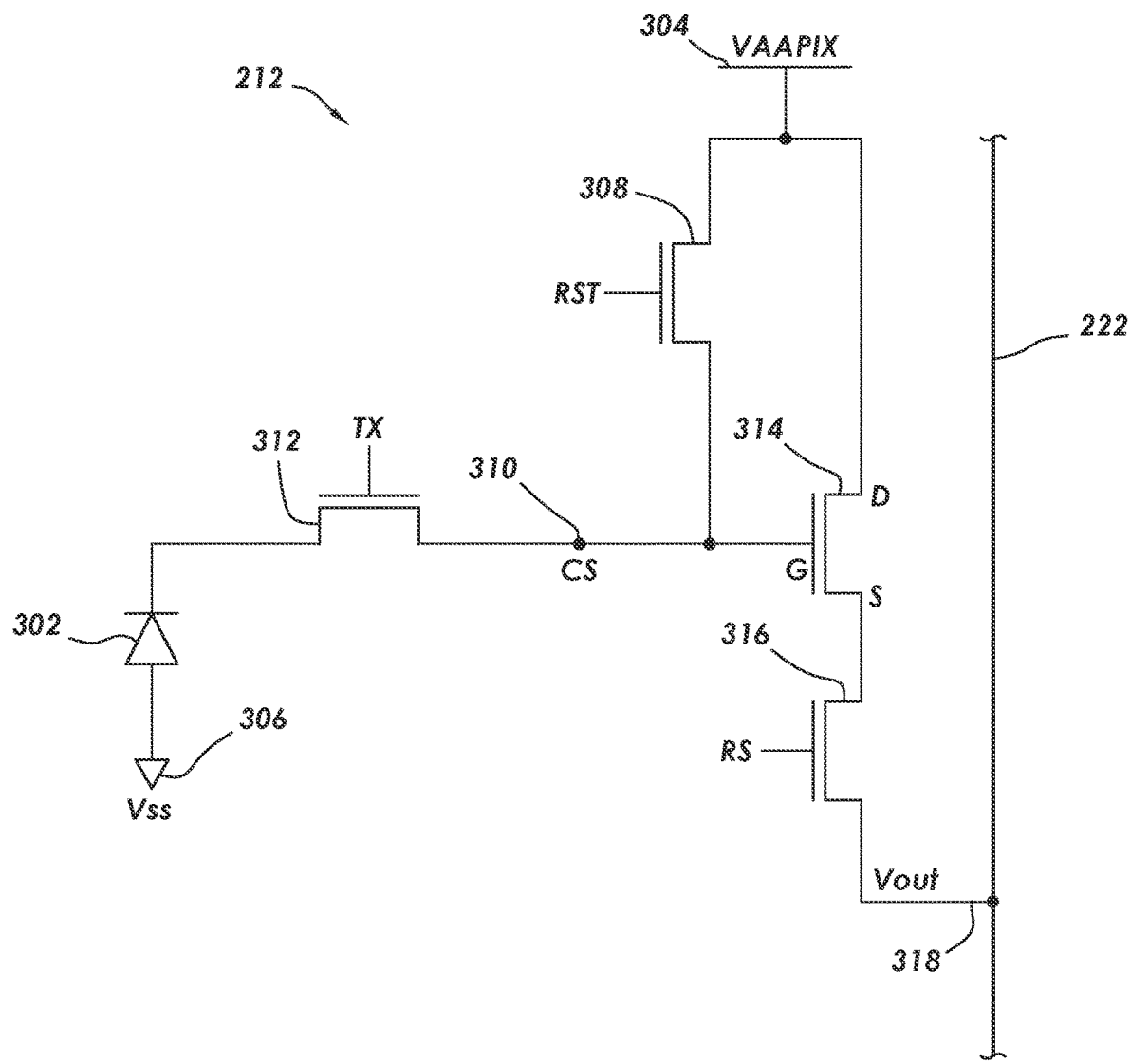
FIG. 3 is a schematic of an example of circuitry in an image sensor pixel in accordance with some implementations.

FIG. 3 shows an example of circuitry in one of the image sensor pixels 212. The image sensor pixels 212 may have fewer components, additional components, or different components in different configurations than the one illustrated in FIG. 3. In particular, FIG. 3 shows that each of the image sensor pixels 212 may comprise a photodetector 302 (for example, a photodiode). A positive pixel power supply voltage, such as supply voltage VAAPIX, may be supplied at a positive power supply terminal 304. A ground power supply voltage, such a reference voltage Vss, may be supplied at a ground terminal 306. Incoming light is gathered by the photodetector 302. The photodetector 302 converts the light to electrical charge.

Before an image is acquired, a reset control signal RST may be asserted. The reset control signal RST turns on a reset transistor 308 and resets a charge storage (CS) node 310 to a voltage equal or close to the supply voltage VAAPIX. The reset control signal RST may then be de-asserted to turn off the reset transistor 308. After the reset process is complete, a transfer gate control signal TX may be asserted to turn on a transfer transistor 312. When the transfer transistor 312 is turned on, charge generated by the photodetector 302 in response to incoming light is transferred to the charge storage node 310. The charge storage node 310 exhibits a capacitance that can be used to store the charge that has been transferred from the photodetector 302. The signal associated with the charge stored in the charge storage node 310 is buffered by a source-follower transistor 314. A row select transistor 316 connects the source-follower transistor 314 to one of the column lines 222.

When it is desired to read out the value of the charge stored in the charge storage node 310, a control signal RS is asserted. The read-out value may be, for example, the value of the charge storage node 310 that is represented by the signal at the source terminal S of the source-follower transistor 314. When the control signal RS is asserted, the row select transistor 316 is turned on and an output signal Vout that is representative of the magnitude of the charge stored in the charge storage node 310 is produced on an output path 318. The output signal Vout is one example of a "pixel signal." When the control signal RS is asserted, one of the column lines 222 can be used to route the output signal Vout from the image sensor pixel 212 to readout circuitry, such as the column controller 218 in FIG. 2.

Figure 4A:
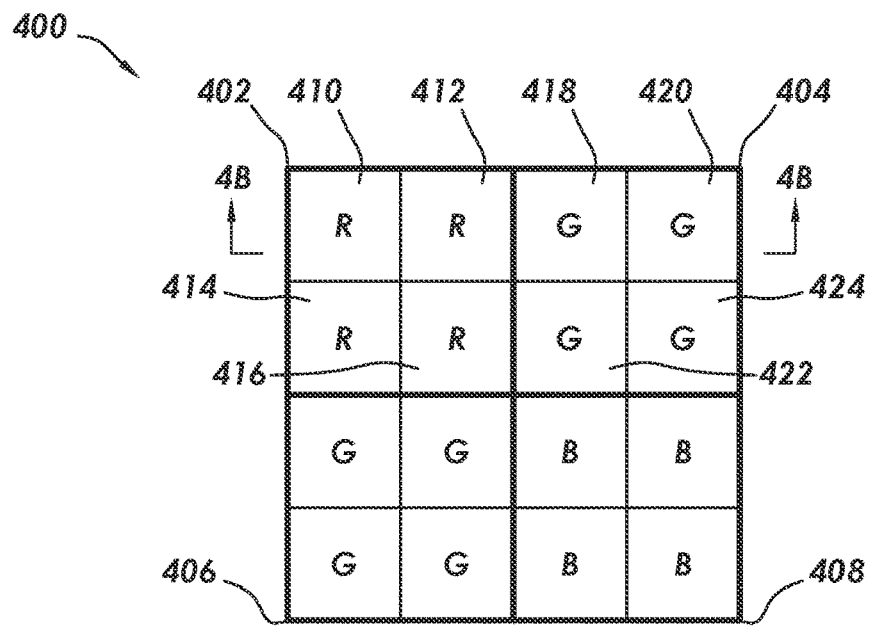
FIG. 4A is a view of an example of a color pattern of split-pixels in accordance with some implementations.

FIG. 4A shows a view of an example of a color pattern 400 of split-pixels. In particular, the color pattern 400 includes a red split-pixel 402, a first green split-pixel 404, a second green split-pixel 406, and a blue split-pixel 408 arranged in a two-by-two grid. Other grid patterns are also possible, such as one-by-four grid. Other color patterns are possible, such as red-yellow-yellow-cyan. The red split-pixel 402 is one example of an "image sensor pixel." The red split-pixel 402 shown in FIG. 4A includes a first red photodetector 410, a second red photodetector 412, a third red photodetector 414, and a fourth red photodetector 416 arranged in a two-by-two grid. In the example shown, the four photodetectors of the red split-pixel 402 abut each other, but in other cases one or more additional layers, such as oxide layers or deep trench isolation (DTI) structures, may reside between them. The first green split-pixel 404 shown in FIG. 4A includes a first green photodetector 418, a second green photodetector 420, a third green photodetector 422, and a fourth green photodetector 424 arranged in a two-by-two grid. A similar discussion regarding the second green split-pixel 406 and the blue split-pixel 408, each of which may be configured in a same or similar manner, is omitted so as not to unduly lengthen the specification.

Figure 4B:
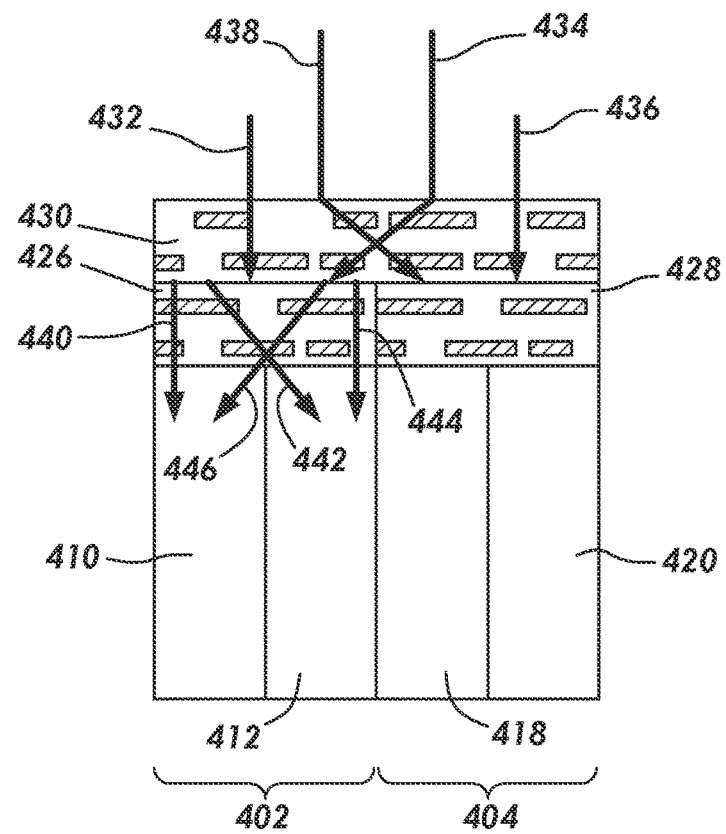
FIG. 4B is a cross-sectional view of the color pattern of FIG. 4A in accordance with some implementations in accordance with some implementations.

FIG. 4B shows a cross-sectional view of the color pattern 400 taken at line 4B-4B of FIG. 4A. In particular, FIG. 4B shows that the red split-pixel 402 further includes a red spectral router 426 positioned above the first red photodetector 410 and the second red photodetector 412. The first red photodetector 410 is one example of a "first photodetector." The second red photodetector 412 is one example of a "second photodetector." Although not visible in the cross-sectional view of FIG. 4B, the red spectral router 426 is also positioned above the third red photodetector 414 and the fourth red photodetector 416. The third red photodetector 414 is one example of a "third photodetector." The fourth red photodetector 416 is one example of a "fourth photodetector." In the example shown in FIG. 4B, the red spectral router 426 abuts the first red photodetector 410 and the second red photodetector 412, but in other cases one or more additional layers, such as oxide or planar layers, may reside between them.

FIG. 4B also shows that the first green split-pixel 404 further includes a green spectral router 428 positioned above the first green photodetector 418 and the second green photodetector 420. The first green photodetector 418 is one example of a "third photodetector." The second green photodetector 420 is one example of a "fourth photodetector." Although not visible in the cross-sectional view of FIG. 4B, the green spectral router 428 is also positioned above the third green photodetector 422 and the fourth green photodetector 424. In the example shown in FIG. 4B, the green spectral router 428 abuts the first green photodetector 418 and the second green photodetector 420, but in other cases one or more additional layers, such as oxide or planar layers, may reside between them.

FIG. 4B also shows a spectral router 430 is positioned above the red spectral router 426 and the green spectral router 428. In the example shown in FIG. 4B, the spectral router 430 abuts the red spectral router 426 and the green spectral router 428, but in other cases one or more additional layers, such as oxide or planar layers, may reside between them.

A spectral router (or nanophotonic light guide) is an optical structure that accepts photons incident on an upper surface. The spectral router then diverts photons from the upper surface to the underlying photosensitive regions of photodiodes. The spectral router 430 is one example of a "second spectral router." The spectral router 430 is configured to direct incident light in the red wavelength range to the red spectral router 426. For example, the portion of the spectral router 430 positioned above the red split-pixel 402 is configured to pass incident light in the red wavelength range, such as between about 625 nanometers and 750 nanometers. Consider, for purposes of discussion, red light entering the red split-pixel 402. An example of red light is illustrated in FIG. 4B by arrow 432. The red light initially encounters a portion of the spectral router 430 positioned above the red split-pixel 402, which passes the red light to the red spectral router 426 of the red split-pixel 402. Further, a portion of the spectral router 430 positioned above the first green split-pixel 404 is configured to direct incident light in the red wavelength range to the red spectral router 426 of the red split-pixel 402. Consider, for purposes of discussion, red light entering the first green split-pixel 404. An example of red light is illustrated in FIG. 4B by arrow 434. The red light initially encounters a portion of the spectral router 430 positioned above of the first green split-pixel 404, which directs the red light to the red spectral router 426 of the red split-pixel 402.

The spectral router 430 is also configured to direct incident light in the green wavelength range to the green spectral router 428. For example, the portion of the spectral router 430 positioned above the first green split-pixel 404 is configured to pass incident light in the green wavelength range, such as between about 495 nanometers and 570 nanometers. Consider, for purposes of discussion, green light entering the first green split-pixel 404. An example of green light is illustrated in FIG. 4B by arrow 436. The green light initially encounters a portion of the spectral router 430 positioned above the first green split-pixel 404, which passes the green light to the green spectral router 428 of the first green split-pixel 404. Further, a portion of the spectral router 430 positioned above the red split-pixel 402 is configured to direct incident light in the green wavelength range to the green spectral router 428 of the first green split-pixel 404. Consider, for purposes of discussion, green light entering the red split-pixel 402. An example of green light is illustrated in FIG. 4B by arrow 438. The green light initially encounters a portion of the spectral router 430 positioned above the red split-pixel 402, which directs the green light to the green spectral router 428 of the first green split-pixel 404.

The red spectral router 426 is one example of a "first spectral router." The red spectral router 426 is configured to direct incident light in a first subset (or sub-band) of the red wavelength range to the first red photodetector 410. For example, the portion of the red spectral router 426 positioned above the first red photodetector 410 is configured to pass incident light in a first subset of the red wavelength range. Consider, for purposes of discussion, 660 nanometer light entering the red spectral router 426 above the first red photodetector 410. An example of 660 nanometer light is illustrated in FIG. 4B by arrow 440. The 660 nanometer light initially encounters a portion of the red spectral router 426 positioned above the first red photodetector 410, which directs the 660 nanometer light to the first red photodetector 410. Further, a portion of the red spectral router 426 positioned above the first red photodetector 410 is configured to direct incident light outside of the first subset of the red wavelength range to one or more neighboring red photodetectors. Consider, for purposes of discussion, 700 nanometer light entering the red spectral router 426 above the first red photodetector 410. An example of 700 nanometer light is illustrated in FIG. 4B by arrow 442. The 700 nanometer light initially encounters a portion of the red spectral router 426 positioned above the first red photodetector 410, which directs the 700 nanometer red light to the second red photodetector 412.

The red spectral router 426 is also configured to direct incident light in a second subset (or sub-band) of the red wavelength range to the second red photodetector 412. For example, the portion of the red spectral router 426 positioned above the second red photodetector 412 is configured to pass incident light in a second subset of the red wavelength range. Consider, for purposes of discussion, 705 nanometer light entering the red spectral router 426 above the second red photodetector 412. An example of 705 nanometer light is illustrated in FIG. 4B by arrow 444. The 705 nanometer light initially encounters a portion of the red spectral router 426 positioned above the second red photodetector 412, which directs the 705 nanometer light to the second red photodetector 412. Further, a portion of the red spectral router 426 positioned above the second red photodetector 412 is configured to direct incident light outside of the second subset of the red wavelength range to one or more neighboring red photodetectors. Consider, for purposes of discussion, 670 nanometer light entering the red spectral router 426 above the second red photodetector 412. An example of 670 nanometer light is illustrated in FIG. 4B by arrow 446. The 670 nanometer light initially encounters a portion of the red spectral router 426 positioned above the second red photodetector 412, which directs the 670 nanometer red light to the first red photodetector 410.

Figure 5A:
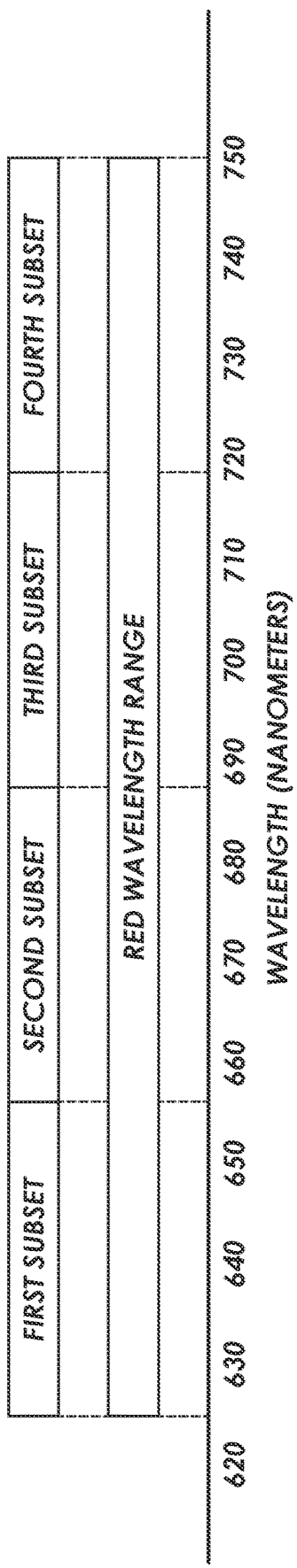
FIG. 5A is a graph of an example of the red light wavelength range divided into four wavelength subsets in accordance with some implementations.
Figure 5B:
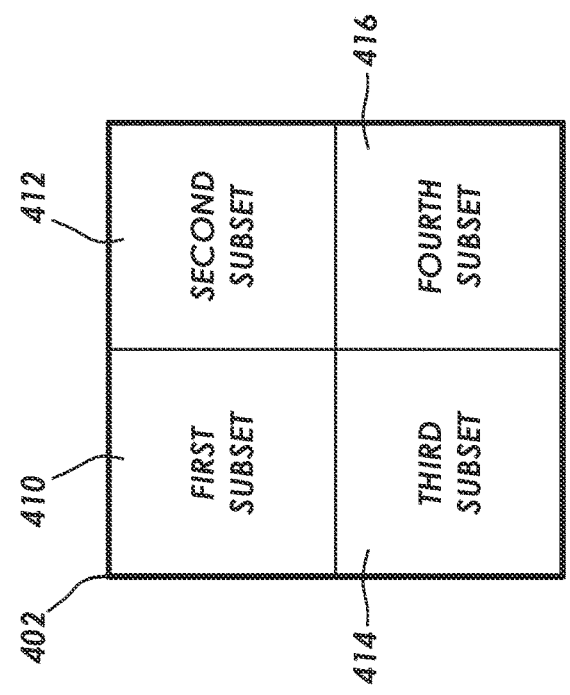
FIG. 5B is a view of an example of a red split-pixel configured to detect four wavelength subsets in accordance with some implementations.

In some implementations, the red spectral router 426 is configured to split red light into four subsets of the red wavelength range. For example, FIG. 5A is a graph illustrating the red wavelength range. FIG. 5A also illustrates an example of four subsets of the red wavelength range that the red spectral router 426 may split red light into. FIG. 5B is a view of an example of the red split-pixel 402. As shown in FIG. 5B, the red spectral router 426 may direct incident light in a first subset of the red wavelength range to the first red photodetector 410, direct incident light in a second subset of the red wavelength range to the second red photodetector 412, direct incident light in a third subset of the red wavelength range to the third red photodetector 414, and direct incident light in a fourth subset of the red wavelength range to the fourth red photodetector 416. In some implementations, the red spectral router 426 is configured to split red light into four subsets with substantially the same size. For example, the red spectral router 426 may direct incident light with wavelengths between 625 nanometers and 656 nanometers to the first red photodetector 410, direct incident light with wavelengths between 657 nanometers and 688 nanometers to the second red photodetector 412, direct incident light with wavelengths between 689 nanometers and 720 nanometers to the third red photodetector 414, and direct incident light with wavelengths between 721 nanometers and 750 nanometers to the fourth red photodetector 416. In other implementations, the red spectral router 426 is configured to split red light into four subsets with different sizes. For example, the red spectral router 426 may direct incident light with wavelengths between 625 nanometers and 639 nanometers to the first red photodetector 410, direct incident light with wavelengths between 640 nanometers and 687 nanometers to the second red photodetector 412, direct incident light with wavelengths between 688 nanometers and 735 nanometers to the third red photodetector 414, and direct incident light with wavelengths between 736 nanometers and 750 nanometers to the fourth red photodetector 416.

In some implementations, the red spectral router 426 is configured to split red light into two subsets of the red wavelength range. For example, FIG. 6A is a graph illustrating the red wavelength range. FIG. 6A also illustrates an example of two subsets of the red wavelength range that the red spectral router 426 may split red light into. FIGS. 6B, 6C, and 6D are views of examples of the red split-pixel 402 arranged diagonally, horizontally, and vertically. For example, as shown in FIG. 6B, the red spectral router 426 may direct incident light in a first subset of the red wavelength range to the first red photodetector 410 and the fourth red photodetector 416, and direct incident light in a second subset of the red wavelength range to the second red photodetector 412 and the third red photodetector 414. FIG. 6B is an example in which the first red photodetector 410 is positioned parallel to the fourth red photodetector 416 and the second red photodetector 412 is positioned parallel to the third red photodetector 414.

In some implementations, the red spectral router 426 is configured to split red light into two subsets with substantially the same size. For example, the red spectral router 426 may direct incident light with wavelengths between 625 nanometers and 687 nanometers to the first red photodetector 410 and the fourth red photodetector 416, and direct incident light with wavelengths between 688 nanometers and 750 nanometers to the second red photodetector 412 and the third red photodetector 414. In other implementations, the red spectral router 426 is configured to split red light into two subsets with different sizes. For example, the red spectral router 426 may direct incident light with wavelengths between 625 nanometers and 700 nanometers to the first red photodetector 410 and the fourth red photodetector 416, and direct incident light with wavelengths between 701 nanometers and 750 nanometers to the second red photodetector 412 and to third red photodetector 414.

The green spectral router 428 is an example of a "third spectral router." The green spectral router 428 is configured to direct different sub-wavelengths within the green wavelength range to different photodetectors in the first green split-pixel 404. A similar discussion regarding the second green split-pixel 406 and the blue split-pixel 408, each of which may be configured in a same or similar manner, is omitted so as not to unduly lengthen the specification.

Conventional hyperspectral image sensors require multiple exposures to generate multispectral images. However, the image sensor controller 214 is configured to determine the amount of incident light detected by each photodetector in each split-pixel of the pixel array 210 during each exposure. Thus, the image sensor 106 generates multispectral images from a single exposure and is faster than conventional sensors. Further, the image sensor controller 214 may combine the amounts of light detected by different photodetectors to determine color information. For example, the green photodetectors in the first green split-pixel 404 and the second green split-pixel 406 that detect a subset in the upper portion of the green wavelength range may detect some yellow light. Thus, the image sensor controller 214 may determine an amount of yellow light by combing: (i) the amounts of light detected by photodetectors in the first green split-pixel 404 and the second green split-pixel 406 that are configured to detect a subset in the upper portion of the green wavelength range; and (i) the amount of light detected by the photodetector in the red split-pixel 402 that is configured to detect a subset in the lower portion of the red wavelength range.

In some implementations, the image sensor controller 214 combines the amounts of light detected by only some of the photodetectors in a split-cell. For example, with reference to the configuration of the red split-pixel 402 discussed above in reference to FIGS. 5A and 5B, the first red photodetector 410 may detect some orange light because the subset of the red wavelength range detected by the first red photodetector 410 is close to the orange wavelength range. Thus, when characterizing red light detected by the red split-pixel 402, the image sensor controller 214 may ignore the amount of light detected by the first red photodetector 410 and only use the amounts of light detected by the other three red photodetectors in the red split-pixel 402.

In some implementations, the image sensor controller 214 is configured to determine a total amount of incident light in a color wavelength range detected by a split-pixel by combining the amounts of light detected by each of the four photodetectors in the split-pixel. For example, the image sensor controller 214 may determine a total amount of red light detected by the red split-pixel 402 by combining the amounts of light detected by each of the four photodetectors in the red split-pixel 402. Thus, in addition to performing hyperspectral imaging, the image sensor 106 may also be used as a conventional RGGB sensor without having to change the structure of the image sensor pixels 212.

Figure 7:
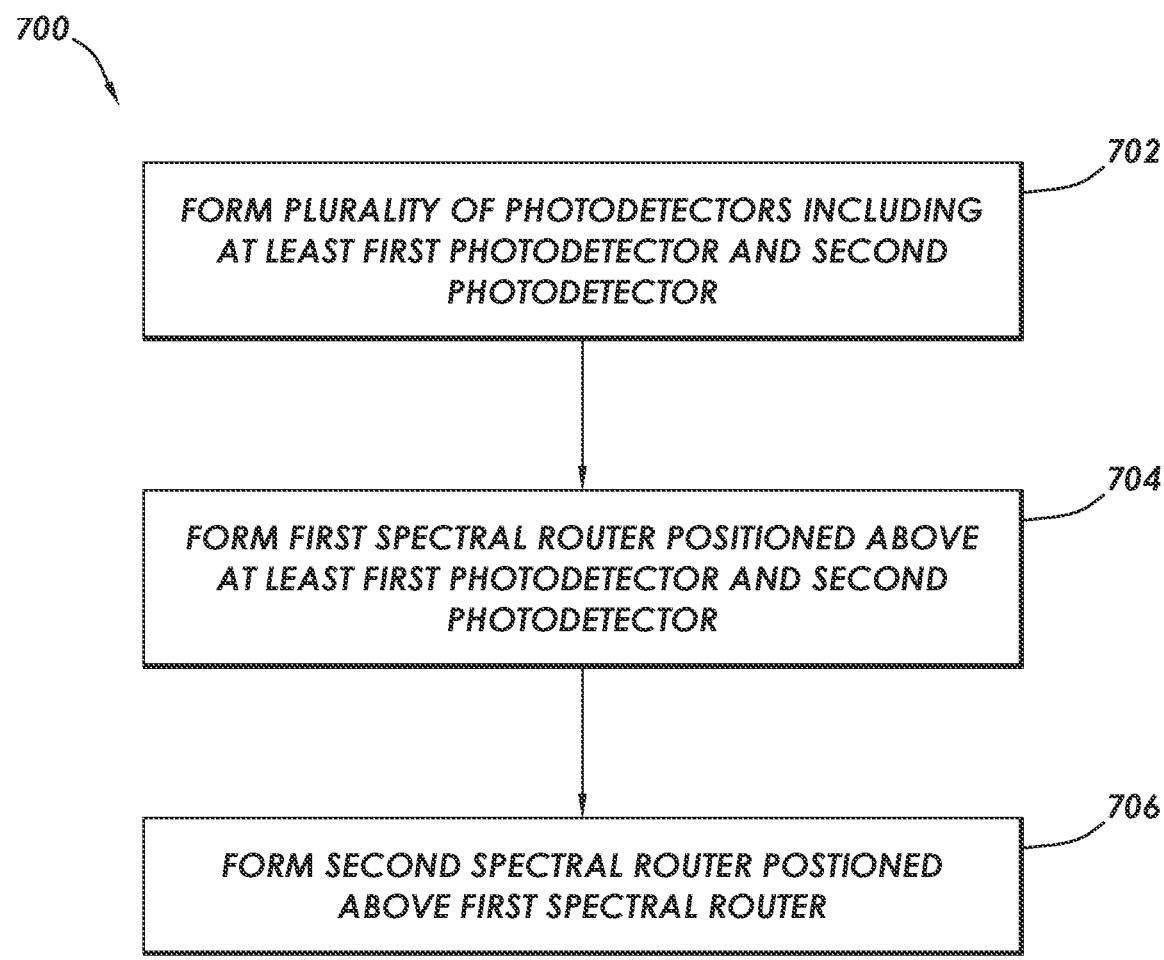
FIG. 7 is a flow diagram of an example of a method for constructing an image sensor pixel in accordance with some implementations.

FIG. 7 is a flow diagram of an example of a method 700 for constructing an image sensor pixel in accordance with some implementations. For simplicity of explanation, the method 700 is depicted in FIG. 7 and described as a series of operation. However, the operations can occur in various orders and/or concurrently, and/or with other operations not presented and described herein. At block 702, a plurality of photodetectors is formed. The plurality of photodetectors includes at least a first photodetector and a second photodetector. For example, the red split-pixel 402 is formed with a plurality of photodetectors including at least the first red photodetector 410 and the second red photodetector 412. At block 704, a first spectral router is formed. The first spectral router is positioned above at least the first photodetector and the second photodetector. For example, the red spectral router 426 is formed above at least the first red photodetector 410 and the second red photodetector 412. The first spectral router is configured to direct incident light in a first subset of a first color wavelength range to the first photodetector. For example, the red spectral router 426 is configured to direct incident light in a first subset of the red wavelength range to the first red photodetector 410. The first spectral router is also configured to direct incident light in a second subset of the first color wavelength range to the second photodetector. For example, the red spectral router 426 is configured to direct incident light in a second subset of the red wavelength range to the second red photodetector 412. At block 706, a second spectral router is formed. The second spectral router is positioned above the first spectral router. For example, spectral router 430 is formed over the red spectral router 426. The second spectral router is configured to direct the incident light in the first subset and the second subset of the first color wavelength range to the first spectral router. For example, spectral router 430 is configured to direct incident light in the first subset and the second subset of the red wavelength range to the red spectral router 426. The second spectral router is also configured to direct incident light in a second color wavelength range to one or more neighboring image sensor pixels. For example, spectral router 430 is configured to direct incident light in the green wavelength range to the first green split-pixel 404 and the second green split-pixel 406.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. An image sensor pixel, comprising:
a plurality of photodetectors including at least a first photodetector and a second photodetector;
a first spectral router positioned above at least the first photodetector and the second photodetector, wherein the first spectral router is configured to:
direct incident light in a first subset of a first color wavelength range to the first photodetector, and
direct incident light in a second subset of the first color wavelength range to the second photodetector; and
a second spectral router positioned above the first spectral router and configured to:
direct the incident light in the first subset and the second subset of the first color wavelength range to the first spectral router, and
direct incident light in a second color wavelength range to one or more neighboring image sensor pixels.

2. The image sensor pixel of claim 1, wherein the plurality of photodetectors further includes a third photodetector and a fourth photodetector, wherein the first spectral router is further positioned above the third photodetector and the fourth photodetector, and wherein the first photodetector, the second photodetector, the third photodetector, and the fourth photodetector are arranged in a two-by-two grid.

3. The image sensor pixel of claim 2, wherein the first spectral router is further configured to:
direct incident light in a third subset of the first color wavelength range to the third photodetector, and
direct incident light in a fourth subset of the first color wavelength range to the fourth photodetector.

4. The image sensor pixel of claim 2, wherein the first spectral router is further configured to:
direct the incident light in the second subset of the first color wavelength range to the third photodetector, and
direct the incident light in the first subset of the first color wavelength range to the fourth photodetector.

5. The image sensor pixel of claim 4, wherein the first photodetector is positioned parallel to the fourth photodetector, and wherein the second photodetector is positioned parallel to the third photodetector.

6. The image sensor pixel of claim 1, wherein the first color wavelength range is for a red color, and wherein the second color wavelength range is for a green color.

7. An image sensor comprising:
a pixel array comprising an image sensor pixel including:
a first photodetector,
a second photodetector,
a first spectral router configured to:
direct incident light in a first subset of a first color wavelength range to the first photodetector, and
direct incident light in a second subset of the first color wavelength range to the second photodetector, and
a second spectral router configured to:
direct incident light in the first color wavelength range to the first spectral router, and
direct incident light in a second color wavelength range to one or more neighboring image sensor pixels in the pixel array; and
a controller configured to:
determine a first amount of light detected by the first photodetector, and
determine a second amount of light detected by the second photodetector.

8. The image sensor of claim 7, wherein the image sensor pixel is a first image sensor pixel, wherein the pixel array further comprises a second image sensor pixel including:
a third photodetector,
a fourth photodetector, and
a third spectral router configured to:
direct incident light of a first subset of the second color wavelength range to the third photodetector, and
direct incident light of a second subset of the second color wavelength range to the fourth photodetector,
wherein the second spectral router is further configured to route incident light of the second color wavelength range to the third spectral router.

9. The image sensor of claim 8, wherein the controller is further configured to:
   determine a third amount of light detected by the third photodetector,
   determine a fourth amount of light detected by the fourth photodetector, and
   determine an amount of a third color of light by combining the first amount of light and the third amount of light.

10. The image sensor of claim 7, wherein the image sensor pixel further includes a third photodetector and a fourth photodetector, and wherein the controller is further configured to:
   determine a third amount of light detected by the third photodetector, and
   determine a fourth amount of light detected by the fourth photodetector.

11. The image sensor of claim 10, wherein the controller is further configured to determine a total amount of light in the first color wavelength range by combining on the first amount of light, the second amount of light, the third amount of light, and the fourth amount of light.

12. The image sensor of claim 10, wherein the first spectral router is further configured to:
   direct incident light of a third subset of the first color wavelength range to the third photodetector, and
   direct incident light of a fourth subset of the first color wavelength range to the fourth photodetector.

13. The image sensor of claim 10, wherein the first spectral router is further configured to:
   direct the incident light of the second subset of the first color wavelength range to the third photodetector, and
   direct the incident light of the first subset of the first color wavelength range to the fourth photodetector.

14. The image sensor of claim 13, wherein the first photodetector is positioned diagonally adjacent to the fourth photodetector, and wherein the second photodetector is positioned diagonally adjacent to the third photodetector.

15. The image sensor of claim 7, wherein the first color wavelength range is between 625 nanometers and 750 nanometers, and wherein the second color wavelength range is between 495 nanometers and 570 nanometers.

16. The image sensor of claim 7, wherein the imaging sensor is included in at least one selected from the group consisting of an automobile, a vehicle, a camera, a cellular telephone, a tablet computing, a webcam, a video camera, a video surveillance system, and a video gaming system.

17. A method for constructing an image sensor pixel, the method comprising:
   forming a plurality of photodetectors including at least a first photodetector and a second photodetector;
   forming a first spectral router positioned above at least the first photodetector and the second photodetector, wherein the first spectral router is configured to:
      direct incident light in a first subset of a first color wavelength range to the first photodetector, and
      direct incident light in a second subset of the first color wavelength range to the second photodetector; and
   forming a second spectral router positioned above the first spectral router, wherein the second spectral router is configured to:
      direct the incident light in the first subset and the second subset of the first color wavelength range to the first spectral router, and
      direct incident light in a second color wavelength range to one or more neighboring image sensor pixels.

18. The method of claim 17, wherein the plurality of photodetectors further includes a third photodetector and a fourth photodetector, wherein the first spectral router is further positioned above the third photodetector and the fourth photodetector, and wherein the first photodetector, the second photodetector, the third photodetector, and the fourth photodetector are arranged in a two-by-two grid.

19. The method of claim 18, wherein the first spectral router is further configured to:
   direct incident light of a third subset of the first color wavelength range to the third photodetector, and
   direct incident light of a fourth subset of the first color wavelength range to the fourth photodetector.

20. The method of claim 18, wherein the first spectral router is further configured to:
   direct the incident light of the second subset of the first color wavelength range to the third photodetector, and
   direct the incident light of the first subset of the first color wavelength range to the fourth photodetector.

* * * * *